US010952929B2

(12) United States Patent
Pierreux et al.

(10) Patent No.: US 10,952,929 B2
(45) Date of Patent: Mar. 23, 2021

(54) AID FOR CUP FEEDING

(71) Applicant: MATERNI N.V., Ninove (BE)

(72) Inventors: Frederik Pierreux, Halle (BE); Victor De Weerdt, Lennik (BE)

(73) Assignee: MATERNI N.V., Aninove (BE)

( * ) Notice: Subject to any disclaimer, the term of this patent is extended or adjusted under 35 U.S.C. 154(b) by 0 days.

(21) Appl. No.: 15/520,643

(22) PCT Filed: Oct. 23, 2015

(86) PCT No.: PCT/BE2015/000057
§ 371 (c)(1),
(2) Date: Apr. 20, 2017

(87) PCT Pub. No.: WO2016/061641
PCT Pub. Date: Apr. 28, 2016

(65) Prior Publication Data
US 2017/0312187 A1 Nov. 2, 2017

(30) Foreign Application Priority Data
Oct. 23, 2014 (BE) .................................. 2014/5028

(51) Int. Cl.
*A61H 11/00* (2006.01)
*A61J 11/04* (2006.01)
(Continued)

(52) U.S. Cl.
CPC ....... *A61J 11/0015* (2013.01); *A47G 19/2272* (2013.01); *A61J 9/00* (2013.01);
(Continued)

(58) Field of Classification Search
CPC ........ B67D 1/07; A61J 11/0015; A61J 11/001
(Continued)

(56) References Cited

U.S. PATENT DOCUMENTS 3,424,157 A * 1/1969 Di Paolo ................ A61J 17/10 215/11.4
5,101,991 A * 4/1992 Morifuji ................ A61J 11/002 215/11.1
(Continued)

FOREIGN PATENT DOCUMENTS

JP 2007039039 A 2/2007
WO WO99/22693 A1 5/1999
(Continued)

OTHER PUBLICATIONS

International Search Report, dated Mar. 16, 2016, from International Application No. PCT/BE2015/000057, filed on Oct. 23, 2015. 5 pages.

(Continued)

*Primary Examiner* — Anthony D Staschick
*Assistant Examiner* — Raven Collins
(74) *Attorney, Agent, or Firm* — HoustonHogle LLP

(57) ABSTRACT

Aid (1) for cup feeding of infants, which aid has a first liquid chamber and a second liquid chamber, wherein the first liquid chamber is provided for mounting on a feeding bottle (2), wherein the first liquid chamber (9) and the second liquid chamber (10) have a shared wall (12), wherein the second liquid chamber is open so that liquid in the second liquid chamber is accessible to an infant, whereby at least the shared wall is manufactured from an elastic material and is provided with an incision (13) with a minimum length of 3 mm such that a liquid flow through the incision from the first liquid chamber to the second liquid chamber is controllable by manipulating the wall.

16 Claims, 1 Drawing Sheet

(51) Int. Cl.
*A61J 9/00* (2006.01)
*A47G 19/22* (2006.01)
*A61J 11/00* (2006.01)
*A61J 1/20* (2006.01)

(52) U.S. Cl.
CPC ............ *A61J 11/045* (2013.01); *A61J 1/2093* (2013.01); *A61J 11/04* (2013.01)

(58) Field of Classification Search
USPC .......................................................... 215/387
See application file for complete search history.

(56) References Cited

U.S. PATENT DOCUMENTS 5,137,183 A * 8/1992 Mikulec ................ A61J 7/0023 222/192
5,553,726 A 9/1996 Park
5,556,008 A * 9/1996 Silver ................... A61J 7/0023 215/DIG. 5
6,071,523 A * 6/2000 Mehta ....................... A61P 9/00 424/400
8,910,809 B2 * 12/2014 Fischer ............. B29C 45/14491 215/11.1
9,828,144 B2 * 11/2017 Johansen ............. A47G 21/004
2004/0006874 A1 * 1/2004 Kamm ................. B65D 51/246 30/141
2004/0164043 A1 * 8/2004 Hakim ................. A61J 11/0015 215/11.5
2015/0202122 A1 * 7/2015 Tesini ...................... A61J 11/04 215/11.5

FOREIGN PATENT DOCUMENTS

WO WO99/39617 A1 8/1999
WO WO03/105635 A1 12/2003

OTHER PUBLICATIONS

International Preliminary Report on Patentability, dated May 4, 2017, from International Application No. PCT/BE2015/000057, filed on Oct. 23, 2015. 7 pages.

* cited by examiner

AID FOR CUP FEEDING

The present invention relates to an aid for cup feeding of infants.

Cup feeding of infants is known and can be applied when an infant does not breastfeed sufficiently. This can have different causes and is often temporary, after which breast-feeding is restarted. Cup feeding is applied as alternative to feeding by means of a feeding bottle with teat so as not to create nipple-teat confusion in newborn infants. Cup feeding is understood to mean that liquid, typically milk, is brought to the mouth of the infant by means of a cup, this being a bowl-like element, wherein the infant then draws the liquid out of the cup using its tongue and is thus fed. In cup feeding it is typically not the intention to empty the cup into the mouth of the infant.

Many aids are known for cup feeding of infants. A spoon can thus be used as cup, wherein the spoon is repeatedly filled and brought to the mouth of the infant so that the infant can be fed via the spoon. It is however time-consuming to repeatedly fill a spoon. The cup can therefore alternatively be formed by a beaker. A beaker has a considerably greater volume than a spoon and can for instance contain a whole food portion for the infant. Feeding an infant by means of a beaker is however risky because an uncontrolled movement of the beaker can cause a wave of liquid to be poured over the infant, which may cause choking and/or soiling.

U.S. Pat. No. 5,556,008 describes an aid for cup feeding of infants. The aid has a first liquid chamber and a second liquid chamber, and wherein the first liquid chamber is provided for mounting on a feeding bottle, wherein the first liquid chamber and the second liquid chamber have a shared wall and wherein the second liquid chamber is open so that liquid in the second liquid chamber is accessible to an infant. A one-way valve is provided here between the feeding bottle and the first liquid chamber such that liquid can flow from the feeding bottle to the first liquid chamber but not the other way round. A perforation is provided in the shared wall. The first liquid chamber is compressible, whereby liquid in the first liquid chamber can be pumped through the perforation as a result of the one-way valve between feeding bottle and first liquid chamber. The amount of liquid in the second liquid chamber can hereby be controlled by performing the pumping movement.

A drawback of the aid of U.S. Pat. No. 5,556,008 is that the aid has a complex form and is time-consuming in use. When the aid is used, particularly at the end of feeding of the infant, the aid has to be disassembled from the feeding bottle. There will typically still be a remnant of liquid in the feeding bottle, and there will also still be a remnant of liquid in the first liquid chamber. It is almost impossible to disassemble the aid from the feeding bottle without wasting liquid. Many infants are given breast milk obtained by expressing. This breast milk is often not available in plentiful amounts, and is therefore too valuable to waste.

It is an object of the invention to provide an aid which has a simpler form and is easier to use.

The invention provides for this purpose an aid for cup feeding of infants, which aid has a first liquid chamber and a second liquid chamber, wherein the first liquid chamber is provided for mounting on a feeding bottle, wherein the first liquid chamber and the second liquid chamber have a shared wall, wherein the second liquid chamber is open so that liquid in the second liquid chamber is accessible to an infant, characterized in that at least the shared wall is manufactured from an elastic material and is provided with an incision with a minimum length of 3 mm such that a liquid flow through the incision from the first liquid chamber to the second liquid chamber is controllable by manipulating the wall.

The first and second liquid chamber have a shared elastic wall. An incision with a minimum length of 3 mm is made in this shared elastic wall. When an incision with a minimum length of 3 mm is made in an elastic wall, manipulation of the shared elastic wall will determine the size of the opening formed by the incision. Because the incision has a minimum length of 3 mm, the opening which can be created by manipulating the wall will be sufficiently large to allow liquid to flow through the opening without having to create a considerable pressure difference between the first chamber and the second chamber. A non-return valve is as a result not necessary between the first liquid chamber and the feeding bottle, such that liquid can flow freely between the first liquid chamber and the feeding bottle. This considerably simplifies the use of the aid according to the invention This is because the bottle can be placed upright during disassembly of the aid from the feeding bottle, whereby all liquid from the feeding bottle and from the first liquid chamber is collected at the bottom of the bottle. The aid can hereby be removed without wasting liquid. The aid according to the invention further takes a considerably simpler form because a pumping movement is not necessary in order to get the liquid from the first liquid chamber to the second liquid chamber. A non-return valve is hereby unnecessary, and the first liquid chamber and the second liquid chamber with the shared wall can also be manufactured via a simple design. Because liquid can flow from first liquid chamber to second liquid chamber without pumping movement and thereby with relatively low pressure differences, it is unnecessary to orient the flow direction through the incision away from the second liquid chamber. The incision can be positioned between first and second liquid chamber such that the liquid flows straight into the second liquid chamber in the direction of the cup. The centre of gravity of the first liquid chamber and the centre of gravity of the second liquid chamber can thus lie in line with the incision. This freedom allows a considerably simpler construction of the aid.

The incision preferably has a minimum length of 5 mm, more preferably a minimum of 7 mm. Tests have shown that the length of the incision influences the convenience of use during the cup feeding and allows a liquid with higher viscosity, also referred to in practice as thicker milk, to be administered to an infant via the aid of the invention.

The incision is preferably continuous. Continuous is defined here as uninterrupted. Continuous is more preferably defined as having no appreciable angles. Continuous is more preferably defined as in one straight line. Tests have shown that a continuous incision is easy to manipulate for the purpose of allowing liquid to flow from the first liquid chamber to the second liquid chamber in controlled manner.

The incision is preferably formed in the elastic shared wall such that the incision is substantially closed when the elastic shared wall is in a rest position, and wherein the incision is provided so as to be opened gradually by manipulation of the elastic shared wall. Because the incision is mainly closed in a rest position of the elastic shared wall, the aid can be placed on a feeding bottle and can close this feeding bottle by means of the first chamber without a manipulation of the aid being necessary for the purpose. Each time the aid is released by a user the incision will close because the shared elastic wall then moves to its rest position. A comfortable and user-friendly operation of the aid can hereby be obtained. The incision can further be opened gradually by manipulation of the shared elastic wall.

By gradually opening the incision the flow of liquid through the incision can be controlled in substantially continuously variable manner. The process of cup feeding can hereby be controlled almost perfectly in a manner which feels natural to a user.

The first liquid chamber preferably has a volume of at least 1 $cm^3$. Because the first liquid chamber has a volume of at least 1 $cm^3$, the shared elastic wall comes to lie at least partially at a distance from the neck of the bottle. The elastic shared wall can hereby be handled in simple manner by the fingers of a user and can thus be manipulated for the purpose of influencing the size of the opening formed by the incision.

The second liquid chamber preferably has a partition which divides the liquid chamber into two segments. The partition is preferably placed here substantially parallel to the wall. Filling of the second liquid chamber can be better controlled by providing a partition in the second liquid chamber. This is because the partition will serve as barrier whereby liquid flowing through the incision cannot accidentally run directly into the mouth of the infant. The partition hereby facilitates use of the aid according to the invention.

The first liquid chamber is preferably provided with an opening which is adapted to connect to a bottle opening so that feeding bottle and first liquid chamber are provided so as to together form a closed entity. The aid is preferably provided for this purpose with a flange at the position of the opening, which flange is pressed against an edge of the bottle opening using a mounting ring when the aid is mounted on a feeding bottle. Feeding bottles are typically provided with external screw thread. Mounting the aid on the feeding bottle using a mounting ring enables the aid to be mounted on a feeding bottle in a conventional manner as in the case of a teat.

The first liquid chamber is preferably mountable on the feeding bottle such that the liquid can flow freely from the feeding bottle to the first liquid chamber and back. This implies that a non-return valve is not present, because a non-return valve would prevent free flow of liquid from the feeding bottle to the first liquid chamber and back. Because a pumping movement is not necessary in the aid according to the invention owing to the incision of more than 3 mm, a non-return valve is not necessary either, and liquid can flow freely.

The first liquid chamber is preferably substantially cylindrical, wherein the first end of the cylinder is provided for mounting on the feeding bottle and wherein the second end of the cylinder is provided with the shared wall. The aid hereby extends from the opening of the bottle in a direction substantially parallel to the longitudinal axis of the bottle. Tests have shown that this facilitates the use of the aid considerably. The incision is more preferably made on or at least close to the longitudinal axis of the feeding bottle when the aid is mounted on the feeding bottle.

The aid is preferably manufactured integrally from an elastic material by means of injection moulding. Integral manufacture by means of injection moulding makes production of the aid simple and inexpensive. The aid is preferably made here from a thermoplastic elastomer. The thermoplastic elastomer is preferably chosen such that it is sterilizable, so that the aid can be cleaned after use, sterilized and reused.

The second liquid chamber is preferably bowl-like so that the second liquid chamber can contain a predetermined quantity of liquid. The second liquid chamber can hereby function as cup and the infant can be fed by means of the cup.

The invention will now be further described on the basis of an exemplary embodiment shown in the drawing.

IN THE DRAWING

The same or similar elements are designated in the drawing with the same reference numerals.

Figure 1:
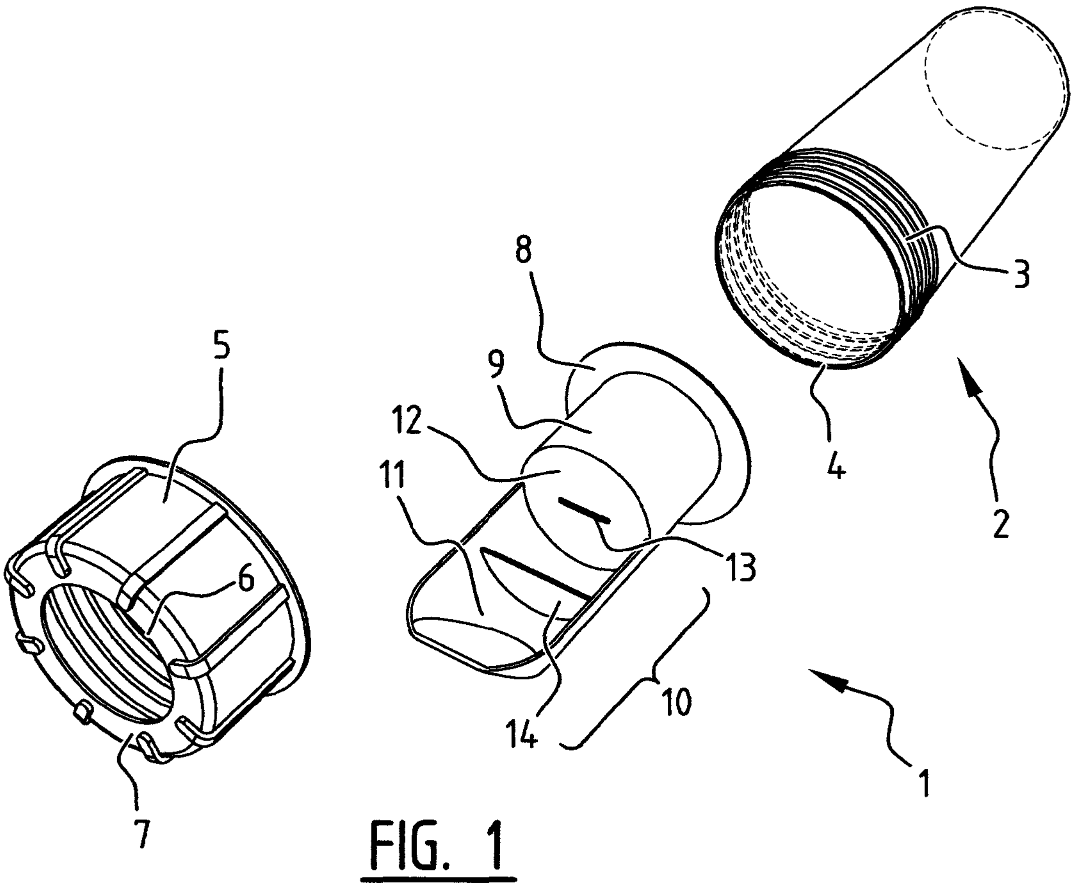
FIG. 1 shows an exploded view of an aid according to a preferred embodiment of the invention and a feeding bottle.

FIG. 1 shows an aid 1 according to an embodiment of the invention. Aid 1 is provided for placing on a feeding bottle 2. The skilled person will appreciate that aid 1 can be placed on the feeding bottle in different ways and using different mounting techniques. In the embodiment as shown in FIG. 1 aid 1 is provided with a flange 8 with a diameter substantially equal to a diameter of the neck of feeding bottle 2. Further provided is a mounting ring 5 which has screw thread complementary to screw thread 3 of feeding bottle 2 and which is provided with an inward directed flange 7 which presses the outward directed flange 8 of the aid against neck 4 of bottle 2. Aid 2 according to the invention is thus pressed against feeding bottle 2 according to the shown embodiment. The inward directed flange 7 is shaped here such that mounting ring 5 has an opening 6 through which at least a part of aid 1 according to the invention can extend. Aid 1 is hereby mounted on a feeding bottle 2 in the same way as a teat is connected to a feeding bottle 2. The skilled person will therefore be able to apply any mounting technique known for mounting of a teat on a feeding bottle 2 to mount aid 1 according to the invention on a feeding bottle 2. The skilled person will hereby understand that mounting ring and aid according to the invention can also be formed integrally. The mounting ring can alternatively be provided with a snap system which is compatible with the feeding bottle.

FIG. 1 shows an aid 1 with a first liquid chamber 9 and a second liquid chamber 10. First liquid chamber 9 is separated from second liquid chamber 10 by means of a shared wall 12. First liquid chamber 9 is substantially closed, at least when aid 1 is mounted on a feeding bottle 2 and when the elastic shared wall is at rest. Substantially closed is understood here to mean that, irrespective of the orientation of aid 1, a negligible amount of liquid escapes from the space defined by the first liquid chamber and the feeding bottle. Second liquid chamber 10 is open. This is understood to mean that liquid in the liquid chamber is readily accessible along at least one side of aid 1. Second liquid chamber 10 can also be described as a cup or bowl. Second liquid chamber 10 is formed such that an infant can draw liquid from the second liquid chamber and can thus be fed. An infant will typically move liquid from the second liquid chamber 10 to the mouth using its tongue. The aid of the invention is provided here so as to move liquid in an efficient and controllable manner out of feeding bottle 2 and into the second liquid chamber.

In order to move liquid out of feeding bottle 2 to second liquid chamber 10 in an efficient and controlled manner the aid according to the invention is provided with an incision 13. Incision 13 is provided in shared wall 12 which extends between first liquid chamber 9 and second liquid chamber 10. Shared wall 12 is manufactured from an elastic material. The whole aid 1 is preferably manufactured from an elastic material. The elastic material from which aid 1 according to the invention is manufactured is typically chosen from known materials for manufacturing teats. These materials are elastic, can be processed via injection moulding and can be sterilized. The elastic material is preferably a thermoplastic elastomer.

First liquid chamber 9 as shown in FIG. 1 is cylindrical. The cylinder has here a first end at the position of the outward directed flange 8 and a second end at the position of shared wall 12. At the first end the first liquid chamber is open so that liquid from the feeding bottle can run into the first liquid chamber and so that liquid from the first liquid chamber can run back into the feeding bottle. A non-return valve is not provided at the first opening, so that liquid can run freely into and out of the liquid chamber. At the second end the liquid chamber is provided with a wall 12. This wall 12 extends between first liquid chamber 9 and second liquid chamber 10. Provided in the wall is an incision 13 which is substantially closed when the wall is in a rest position. Because wall 12 is manufactured from an elastic material, wall 12 can be manipulated such that incision 13 opens, whereby liquid can flow out of first liquid chamber 9 into second liquid chamber 10. This is further elucidated below with reference to FIG. 2.

Second liquid chamber 10 is provided for the purpose of containing a predetermined quantity of liquid. Second liquid chamber 10 is preferably segmented by means of a partition 14. This partition 14 is preferably positioned in the second liquid chamber at a distance from and substantially parallel to shared wall 12. Partition 14 hereby forms a barrier for liquid flowing through the incision into the second liquid chamber. This barrier 14 hereby prevents an infant having to cope with a sudden wave of liquid as a result of a wrong movement by a user and thereby uncontrolled opening of incision 13. Owing to the partition it will be possible to fill a second segment 11 of second liquid chamber 10 with liquid in a controlled manner.

Figure 2:
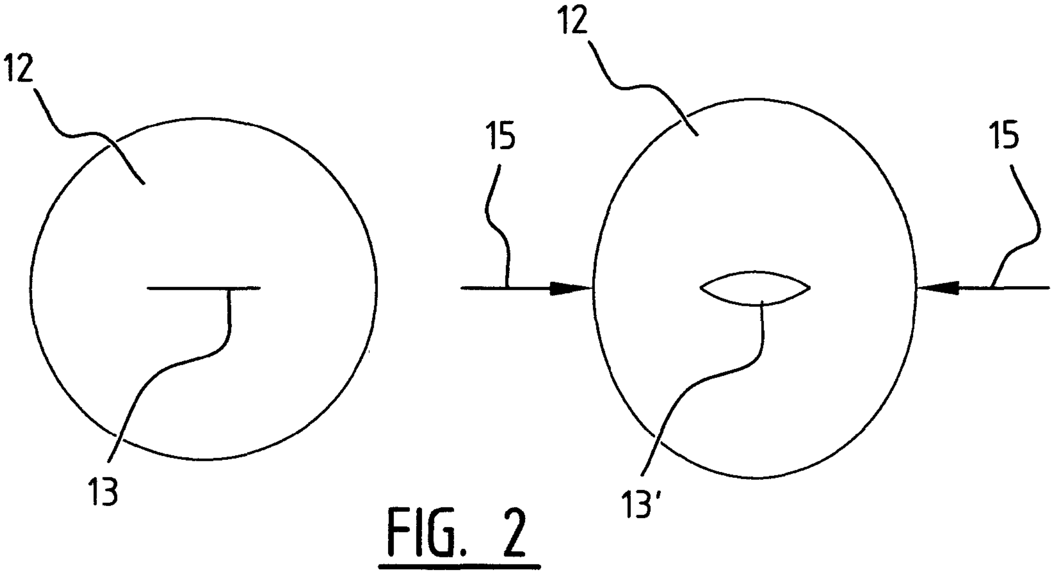
FIG. 2 shows a cross-section of the shared wall of the aid according to a preferred embodiment of the invention.

FIG. 2 shows a plane section of shared wall 12. The left half of FIG. 2 here shows shared wall 12 in a rest position and the right half of FIG. 2 shows shared wall 12 in a manipulated position. Incision 13 is preferably made in shared wall 12 such that in a rest position of shared wall 12 the incision is substantially closed and thereby substantially forms an obstruction so that liquid cannot flow through the incision. In manipulated state of incision 13 the incision 13 spreads open such that an opening through which liquid can flow is created in shared wall 12. Incision 13 preferably takes a continuous form here. The skilled person will however appreciate that configurations wherein the incision consists of a plurality of segments can also have the intended effect. Incision 13 is preferably not angular, i.e. preferably takes a curved or most preferably straight form. Tests have shown that an incision which is not angular opens easily upon manipulation of shared wall 12. Incision 13 is most preferably linear and has a length of a minimum of 3 mm, preferably a minimum of 5 mm, more preferably a minimum of 7 mm.

Shared wall 12 is preferably manipulated by compressing the wall as illustrated with arrows 15 in the right half of FIG. 2. A force 15 is preferably applied to the wall, wherein the force 15 lies substantially in line with incision 13. Owing to the elasticity of shared wall 12 the force 15 lying in line with incision 13 will result in shared wall 12 deforming and the incision thus opening. The skilled person will appreciate that the size of the opening depends on the magnitude of the force and the elasticity of the material and the construction of the aid. Tests have shown that, when a feeding bottle with an aid is held in the hand, shared wall 12 can be taken between two fingers in simple manner, wherein the pressure force of the fingers determines the size of the opening of incision 13. A user can in this way control the liquid flow from first chamber 9 to second chamber 10 in very simple and intuitive manner. In FIG. 2 the opened incision is designated with reference numeral 13'.

In order to allow a user to manipulate shared wall 12, shared wall 12 preferably lies at least partially at a distance from the feeding bottle. This is because the feeding bottle is typically made from a plastic which is not, or at least not very, elastic such that compression of the feeding bottle is impossible or at least very difficult. When shared wall 12 lies at a distance from the feeding bottle, as is also the case in the embodiment of FIG. 1, a user has sufficient space on the outer side of the aid to place his/her fingers in line with incision 13. In the embodiment of FIG. 1 the distance between feeding bottle 2 and shared wall 12 is obtained as a result of the length of the cylindrical first liquid chamber 9. The skilled person will however appreciate that many embodiments can be envisaged wherein shared wall 12 lies at least partially at a distance from feeding bottle 2. A second liquid chamber can thus be provided with an opening on one side, which opening is mountable on feeding bottle 2. This opening then typically lies in line with the opening at the neck of the feeding bottle. When the first liquid chamber has a minimum volume of 1 $cm^2$ and is provided with the shared wall on a second side, which is not necessarily the side opposite the side in which the opening is provided, the shared wall will always be accessible for compression. Shared wall 12 of the first liquid chamber however preferably lies opposite the opening which is connected to the bottle such that the liquid can flow from feeding bottle 2 in substantially one direction through the first liquid chamber and through the incision in the direction of the second liquid chamber.

A cylindrical first liquid chamber 9 has the advantage that the orientation between the aid according to the invention and mounting ring 5 is not predetermined. The aid can be used in any relative position in relation to the mounting ring and relative to feeding bottle 2. Second liquid chamber 11 more preferably takes a smaller form than first liquid chamber 9 in two of the three dimensional directions such that second liquid chamber 11 is movable through opening 6 of the mounting ring. This simplifies assembly and disassembly of an aid according to the invention on and from a feeding bottle 2. Such a form will further facilitate the production of an aid 1 according to the invention in that the aid can be ejected in simple manner from a mould.

A skilled person will understand the principles and different embodiments of the aid according to the invention on the basis of the above description. The figures and the description are not limitative for the invention, which is defined solely in the claims.

The invention claimed is:

1. An aid for cup feeding of infants, which aid has a first liquid chamber and a second liquid chamber, wherein the first liquid chamber is provided for mounting on a feeding bottle such that the liquid can flow freely from the feeding bottle to the first liquid chamber and back, wherein the first liquid chamber and the second liquid chamber have a shared wall, wherein the second liquid chamber is a cup or bowl and open so that liquid in the second liquid chamber is accessible to the mouth of an infant using its tongue to move liquid out of the cup, characterized in that at least the shared wall is manufactured from an elastic material, the shared wall is provided with an incision with a minimum length of 3 mm positioned across the sidewalls of the feeding aid, and by compressing the sidewalls of the feeding aid by the fingers of a user a force is applied substantially in line with the incision, resulting in a deformation of the shared wall and an opening of the incision such that a liquid flow through the incision from the first liquid chamber to the second liquid chamber is controllable.

2. The aid as claimed in claim 1, wherein the incision has a minimum length of 5 mm, preferably a minimum of 7 mm.

3. The aid as claimed in claim 1, wherein the incision is continuous.

4. The aid as claimed in claim 1, wherein the incision is formed in the elastic shared wall such that the incision is substantially closed when the elastic shared wall is in a rest position, and wherein the incision is provided so as to be opened gradually by manipulation of the elastic shared wall.

5. The aid as claimed in claim 1, wherein the first liquid chamber has a minimum volume of 1 $cm^3$.

6. The aid as claimed in claim 1, wherein the second liquid chamber has a partition which divides the liquid chamber into two segments.

7. The aid as claimed in claim 6, wherein the partition is placed substantially parallel to the wall.

8. The aid as claimed in claim 1, wherein the first liquid chamber is provided with an opening which is adapted to connect to a bottle opening so that feeding bottle and first liquid chamber are provided so as to together form a closed entity.

9. The aid as claimed in claim 8, wherein the aid is provided with a flange at the position of the opening, which flange is pressed against an edge of the bottle opening using a mounting ring when the aid is mounted on a feeding bottle.

10. The aid as claimed in claim 1, wherein the first liquid chamber is substantially cylindrical, wherein the first end of the cylinder is provided for mounting on the feeding bottle and wherein the second end of the cylinder is provided with the wall.

11. The aid as claimed in claim 1, wherein the aid is manufactured integrally from an elastic material by means of injection molding.

12. The aid as claimed in claim 11, wherein the elastic material is a thermoplastic elastomer.

13. The aid as claimed in claim 1, wherein the second liquid chamber is bowl-like so that the second liquid chamber can contain a predetermined quantity of liquid.

14. The aid as claimed in claim 1, wherein the first liquid chamber is substantially cylindrical, wherein the first end of the cylinder is provided for mounting on the feeding bottle and wherein the second end of the cylinder is provided with the shared wall.

15. The aid as claimed in claim 1, wherein the incision is made on or at least close to the longitudinal axis of the feeding bottle when the aid is mounted on the feeding bottle.

16. The aid as claimed in claim 1, wherein the center of gravity of the first liquid chamber and the center of gravity of the second liquid chamber lie in line with the incision.

* * * * *